United States Patent [19]

Näsman et al.

[11] Patent Number: 5,415,908
[45] Date of Patent: May 16, 1995

[54] POLYMER SUPPORTS COMPRISING HIGHLY REACTIVE GRAFTED POLYOLEFIN INESCAPABLY ENCLOSED WITHIN A MESH FABRIC BAG

[76] Inventors: Jan H. Näsman, Rakuunatie 58 a C 48, 20720 Turku; Robert T. Peltonen, Kupittaankatu 47 A 22, 20700 Turku; Kenneth B. Ekman, Kaistisentie 21, 20780 Kaarina; Mats J. Sundell, Kupittaankatu 89 B 8, 20810 Turku, all of Finland

[21] Appl. No.: 67,540

[22] Filed: May 26, 1993

[51] Int. Cl.6 .................. B29D 22/00; B32B 1/04; B32B 5/16
[52] U.S. Cl. .................. 428/36.2; 428/36.1; 428/68; 428/74; 428/76; 428/282; 428/283; 428/286
[58] Field of Search .............. 428/68, 74, 76, 280, 428/281, 282, 233, 234, 36.1, 36.2, 36.4, 283, 240, 286

[56] References Cited

U.S. PATENT DOCUMENTS

| | | | |
|---|---|---|---|
| 3,849,243 | 11/1974 | Grot | 428/74 |
| 5,066,527 | 11/1991 | Newell | 428/35.6 |
| 5,124,188 | 6/1992 | Roe et al. | 428/76 |
| 5,326,825 | 7/1994 | Mäsman et al. | |

Primary Examiner—James D. Withers
Attorney, Agent, or Firm—Adduci, Mastriani, Schaumberg & Schill

[57] ABSTRACT

The invention concerns a polymer support of with highly accessible reactive groups onto which desired functional groups or metals can be attached, the polymer support comprising a polymer material which is grafted with reactive groups suitable to bind the functional group or metal to be loaded. The polymer material is encompassed in a bag made of meshed fabric which is tight enough to essentially prevent the escape of the polymer material from the bag. Furthermore, the invention relates to a functionalized polymer support and to a process for its preparation. The invention also concerns a product useful as an intermediate in the preparation of the polymer support.

12 Claims, 4 Drawing Sheets

POLYMER SUPPORTS COMPRISING HIGHLY REACTIVE GRAFTED POLYOLEFIN INESCAPABLY ENCLOSED WITHIN A MESH FABRIC BAG

FIELD OF INVENTION

This invention relates to a polymer support with highly accessible reactive groups encompassed in a meshed fabric onto which desired functional groups or metals can be attached, a functionalized polymer support and a process for its preparation. The invention further relates to a product useful as an intermediate for the preparation of the polymer support.

A polymer support in the form of a felt-bag is extremely easy to handle and can further be functionalized for tailored applications, e.g. for use as a polymer support for reagents and catalysts in organic reactions and reactive separations. The most advantageous feature of a polymer support in the form of a felt-bag is the ease of separation: The felt-bag can manually be removed from a reaction solution, which stays free from suspended catalyst particles during and after the reactions. Furthermore, the felt-bag can be prepared in several forms and with desired amounts of loaded reagent, which is very important for use in organic syntheses. A polymer Supported reagent prepared in this way is especially suitable for use in batch applications e.g. in small-scale laboratory work, but it can also preferably be used in continuous flow processes.

BACKGROUND OF THE INVENTION

The idea of using polymers as supports for catalysts has been known since the late 1950's and the polymers used as supports have mainly been crosslinked polystyrene or polyvinylpyridine based materials. Reagents supported on crosslinked polymer matrices have many advantages compared with low-molecular weight species, like ease of separation, reuse of catalysts, adaptability to continuous flow processes, reduced toxicity and odor. The main disadvantages with these crosslinked reagents are higher cost, lower reactivity due to diffusional limitations and greater difficulty of analysis of the supported species and impurities. Furthermore, they are mostly in the form of powders which always have to be filtered from the reaction media (Hodge, P., Sherrington, D. C., (Eds.), Synthesis and separations using functional polymers, John Wiley & Sons, New York, (1988); Ford, W. T., (Ed.), Polymeric reagents and catalysts, American Chemical Society, Washington, DC, (1986)).

A polymer support used in a particular application should fulfill a number of important functions simultaneously. First, the support must possess the correct mechanical properties. For example, in column or batch applications, supports must be mechanically strong to resist compression and fraction into fine particles. Secondly, the support must possess the correct physical structure in order to ensure that a high amount of the functional groups in the material are accessible to the reaction phase. Finally, the support must provide the correct microenvironment to optimize the process being carried out, e.g. it must provide the correct polarity, hydrophilicity, microviscosity etc. In general, these support requirements have been demanded by default rather than by careful argument and design (Guyot, A., Reactive Polymers. 16, (1992), 233).

A useful method for preparing polymer bound reactants, with a potential of solving many of the problems mentioned above, is grafting and, especially, radiation grafting offers promising new opportunities (Hartley, F. R., J. Polym. Sci., Polym. Chem. Ed., 20, (1982), 2395; Garnett, J. L., J. Polym. Sci., Polym. Lett., 19, (1981), 23; Akelah, A., J. Appl. Polym. Sci., 28, (1983), 3137). This method involves taking a polymer with appropriate morphology and physical properties and introducing reactive sites, free radicals, into the polymer chain by irradiation. The free radicals can either combine to give cross-links, as is the case of, for example, polyethylene, or cause chain scission, as in the case of, for example, polypropylene. In the presence of vinyl monomers, on the other hand, the free radicals can initiate graft copolymerization.

The preparation of graft copolymers and the use of graft copolymers in a variety of different applications are well known both in the scientific literature and patents (Stannet, V. et al., Radiat. Phys. Chem., 35, (1990)).

Three different methods of radiation grafting have been developed and most of the work has concentrated on the use of low dose rate gamma rays from $^{60}$Co sources. During the past few years, however, there has been much interest in using high energy electrons from accelerators with high dose rates ($10^6$–$10^9$ rads/sec), since these high dose rates make radiation chemical processes commercially more attractive. The chemistry involved is, however, similar whether gamma or electron radiation is utilized, and therefore the graft resulting from different sources does not significantly differ. The three methods of radiation grafting that have received special attention are: (1) direct radiation grafting of a vinyl monomer onto a polymer (mutual grafting), (2) grafting on radiation-peroxidized polymers (peroxide grafting) and (3) grafting initiated by trapped radicals (pre-irradiation grafting).

The mutual grafting by irradiating the polymer in the presence of the monomer is a fairly simple and effective method, since the free radicals initiate polymerization immediately as they are generated. The disadvantage of this method is, however, that simultaneously with the graft copolymerization, homopolymerization of the monomer occurs upon irradiation.

When grafting radiation-peroxidized polymers, the polymer is first irradiated in the presence of oxygen, thus forming peroxides and hydroperoxides that are stable and can be stored in the polymer for a long period of time. Grafting is activated by cleavage of the peroxides or hydroperoxides by heat, UV-light or catalysts in the monomer solution.

The pre-irradiation grafting by irradiation of the polymer alone in an inert atmosphere and immersing the irradiated polymer in a monomer solution requires additional steps in comparision to direct grafting, but the advantage is that only a small amount of homopolymer is formed, mainly by a chain transfer process. The grafting process is controlled by the diffusion of the monomer into the polymer and can to some extent be facilitated by the use of solvents that are able to swell the formed graft copolymer.

Pre-irradiation grafting is mostly preferred since this method produces only small amounts of homopolymer in comparison to mutual grafting.

SUMMARY OF THE INVENTION

One object of this invention is to provide a polymer support with highly accessible reactive groups encompassed in a meshed fabric onto which desired functional groups or metals can be attached.

Another object of the invention is to provide a functionalized polymer support.

Another object of the invention is a process for the preparation of a functionalized polymer support.

A further object of the invention is a product useful as an intermediate for the preparation of the polymer support.

Particularly, one object of the present invention is a process for the preparation of a polymer support with high accessibilty of active sites and ease of handling. This polymer support is obtained by pre-irradiation grafting of vinyl monomers onto polymer felt-bags, in particular onto felt-bags made of polyolefins, and subsequently functionalizing the obtained felt-bags with different reagents, e.g. such as transition metals. Such metal-loaded graft copolymers find use especially as catalysts, e.g. for hydrogenation and oxidation reactions.

DETAILED DESCRIPTION OF THE INVENTION

The invention provides a polymer support with highly accessible reactive groups encompassed in a meshed fabric onto which desired functional groups or metals can be attached, said polymer support comprising a polymer material which is grafted with reactive groups suitable to bind the functional group or metal to be attached. The polymer support is characterized in that the polymer material is encompassed in a bag made of meshed fabric which is tight enough to essentially prevent the polymer material from escaping or coming out from the bag.

According to a preferred embodiment, the polymer material is, for example, a polyolefin or fluorine containing polyolefine, particularly a homo- or copolymer of ethylene or propylene or a fluorine containing ethylene or propylene.

The polymer material is preferably formed into a felt by needle punching several fibrous layers, or into a non-woven fabric by hot-sealing. Preferred fiber lengths range from 1 mm to 120 mm. The use of fibrous fabrics instead of pellets or the like is preferred because fibers combine acceptable surface area, good mechanical strength, easy handling and optimal mass transport through the fabric.

The reactive group is preferably a double bond containing substance. Most preferably, the reactive group is a compound selected from a group of monomers consisting of a carboxylic acid, acrylate, acrylamide, vinylpyridine, phosphonic acids and styrene derivatives. Preferred carboxylic acids are for example acrylic acid, methacrylic acid, itaconic acid and maleic acid. Examples of preferred acrylates are hydroxyethyl acrylate, glycidyl methacrylate and 2-(dimethylamino)ethylmethacrylate). Examples of preferred phosphonic acids are vinyl phosphonic acid and 1-(vinylphenyl)propane-2,2-(bisphosphonic acid). Preferred styrene derivatives are for example styrene, vinyl benzyl chloride, m-isopropyl-α,α-dimethyl benzyl isocyanate and vinylbenzylimino diacetic acid.

The meshed fabric is preferably a non-woven fabric based on an organic polymer. In this case the bag can also be grafted and loaded with functional groups or metals.

The invention further provides a functionalized polymer support in which a functional group or metal is attached to the reactive group of the polymer support according to the invention. The metal is for example palladium or ruthenium, and the functional group can for example be a desired reagent.

The invention further provides a product useful as intermediate in the preparation of a polymer support according to this invention, which product comprises a polymer material to which can be grafted reactive groups suitable for attaching functional groups or metals, said polymer material being encompassed in a bag made of meshed fabric which is tight enough to essentially prevent polymer material from escaping out from the bag.

The invention further provides a process for the preparation of a functionalized polymer support comprising the steps of a) exposing the polymer material to radiation in an inert atmosphere, b) immersing the irradiated polymer material in a monomer or aqueous monomer solution of compounds selected from the group consisting of a carboxylic acid, acrylate, acrylamide, vinylpyridine, phosphonic acid and a styrene derivative;

c) separating the resulting graft copolymer obtained in step b), and d) functionalizing the product separated in step c) with a reagent useful to attach a desired functional group or metal to the polymer support characterized in that the polymer material is encapsulated into a shell of a meshed fabric to form a closed bag either
i) before the polymer material is exposed to radiation in an inert atmosphere, or
ii) after the separation according to step c) above, or
iii) after the functionalizing according to step d) above.

In case also the meshed fabric is based on an organic polymer that should be grafted it is practical to encapsulate the polymer in the meshed fabric before the radiation.

On the other hand a grafted bag material does not exhibit as good strength properties as untreated material. In case bags with high mechanical strengths are desirable, then it is preferable to encapsulate the polymer material after the grafting step.

Figure 1:
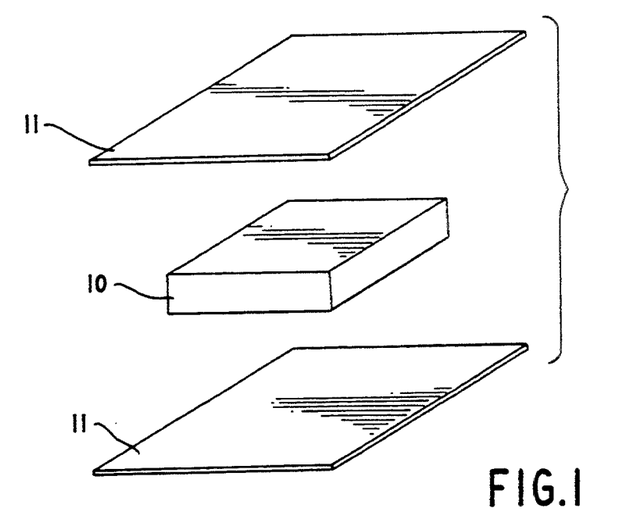
FIGS. 1 to 3 show a schematical view of the layers of the polymer support, hot-sealing the layers to form the polymer support and the release of pressure from the polymer support formed.
Figure 2:
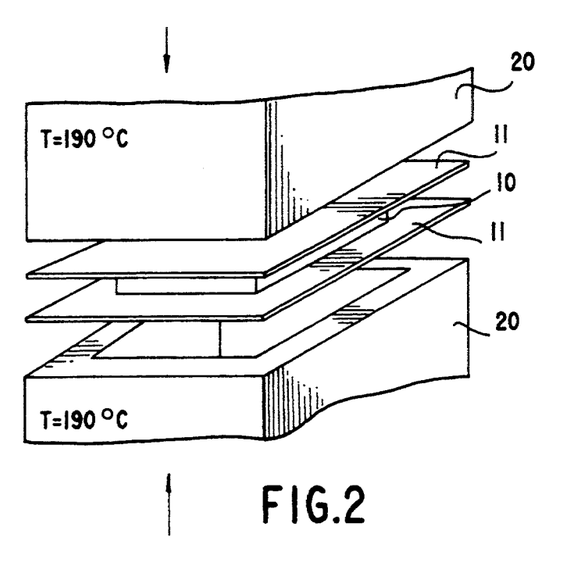
Figure 3:
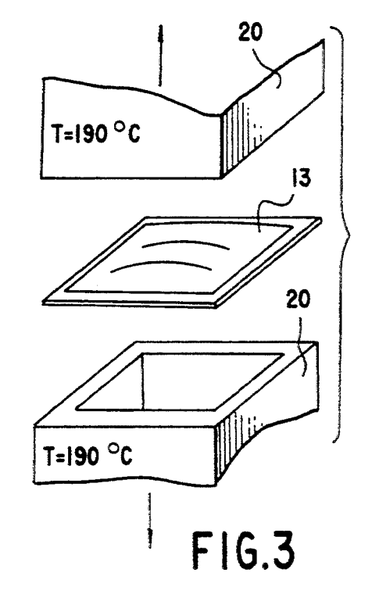
Figure 5:
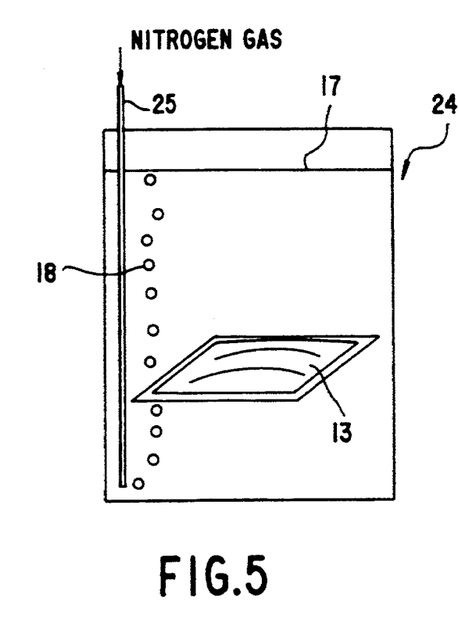
FIG. 5 shows schematically the immersion of the irradiated polymer material enclosed in the bag.
Figure 6:
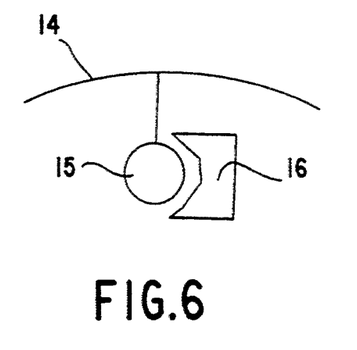
FIG. 6 is a schematical view of the attachment of a functional group to the polymer support.

More specifically the invention relates to a process which comprise the steps of
encapsulating fibre felts of organic polymers into a shell of non-woven fabrics of organic polymers by hot-sealing, (FIG. 1 to FIG. 3),
exposing the felt-bag prepared as described above to radiation in an inert atmosphere, (FIG. 4),
immersing the irradiated felt-bag in a monomer or aqueous monomer solution selected from the group of carboxylic acids, acrylate, acrylamide, phosphonic acid, vinylpyridine and styrene derivatives e.g. vinylbenzylchloride, (FIG. 5),
separating the resulting graft copolymer, and
functionalizing the formed graft copolymer felt-bag with desired reagents, (FIG. 6).

Figure 4:
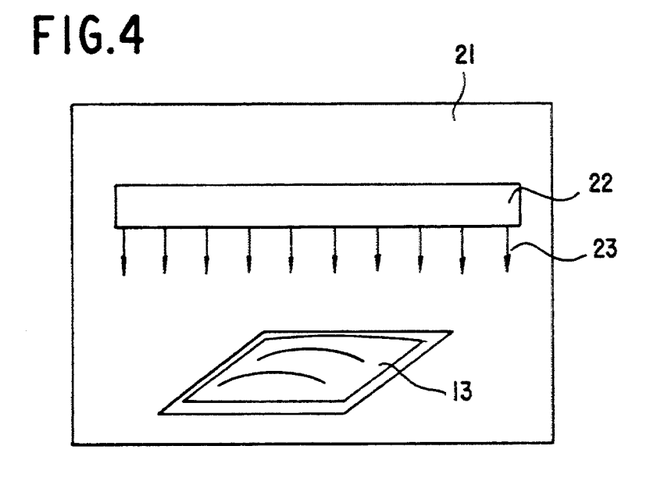
FIG. 4 shows schematically the irradiation of the polymer material enclosed in the bag in a monomer solution.

Referring to the drawings, reference number 10 indicates the polymer felt to be surrounded by the non-woven shells 11. Pressure is applied by a press 20 at a temperature of 190° C. and a polymer support 13 is obtained. FIG. 4 shows schematically the irradiation of the polymer support 13. The polymer support 13 is placed in an electron accelerator 21 and subjected to an electron beam 23 from a linear cathode 22 in an inert atmosphere. FIG. 5 shows schematically the immersion of the irradiated polymer support. The polymer support is placed in a reaction vessel 24 containing a monomer solution the surface of which is indicated by reference number 17. Nitrogen gas is let into the monomer solution via the tube 25 to remove dissolved oxygen. Reference number 18 indicates the nitrogen gas bubbles. FIG. 6 is a schematical view of the attachment of a functional group to the polymer support. The functional group 16 is attached onto the grafted side chain 15 attached to the polymer chain 14.

It should be noted that the shape of the felt-bag is not to be limited to a square, but it can also be obtained in any other form e.g. rectangular, circular or cylindrical or as a web.

The supports prepared according to the invention exhibit many feasible properties, such as having non-crosslinked grafted side chains, the possibility of achieving a very high capacity, i.e. high extent of grafting, as well as high accessibility if the grafted copolymer is allowed to swell in a suitable solvent. The graft copolymers obtained usually combine both excellent chemical resistance and mechanical strength, and a great advantage is the ease of separation from the reaction solution.

The organic polymers used in the preparation of the felt-bags are selected from the group of polyolefins and are thus polymers from α-olefins. Particularly preferred polyolefins are homo- and copolymers of ethylene and propylene.

The process according to the invention thus comprises a first step of encapsulating fibre felts into shells of non-woven fabrics by hot-sealing. The felt-bag obtained by this way is then irradiated with electrons (or any other form of ionizing radiation) from an accelerator under a inert atmosphere (<300 ppm $O_2$) using a radiation dose dependent on the sample treated. The irradiated felt-bags are then immersed in the previous mentioned monomer- or aqueous monomer solutions at appropriate temperatures, and graft copolymer felt-bags, modified with different amounts of the earlier mentioned monomers, can be prepared by varying the reaction time, reaction temperature and the concentration of monomer in the graft solution.

It is necessary to remove in advance any dissolved oxygen from the graft solution by purging the solutions with nitrogen, since oxygen readily inhibits the progress of the grafting reactions. The resulting graft copolymers are e.g. Soxhlet extracted with water or chloroform to remove any unreacted monomer and homopolymer. The grafted felt-bags are then usually dried to constant weight in an oven. The extent of grafting is determined according to $$\frac{(m_1 - m_0) * 100}{m_0} = \text{extent of grafting (\%)}$$

$m_0$ = weight of original sample
$m_1$ = weight of grafted sample

The temperature of the graft solution can be varied in the range of −20° to +200° C., but the graft reaction is more easily controlled in the temperature range of 20° to 50° C.

After grafting, metal ions or desired reagents are loaded onto the graft copolymer. If the graft copolymer is dried after the grafting step, the graft copolymer is swollen prior to loading with e.g. a metal, preferably by keeping it in a suitable solvent, such as water, overnight in order to achieve a maximum swelling. A water solution of e.g. a suitable transition metal salt, such as chloride salt, is added and the mixture is stirred. The resulting metal loaded graft copolymer is extracted, such as Soxhlet extracted, with water to remove any unbound ions, and dried.

The amount of metal in the polymer can be determined e.g. by repeated extraction with 1M hydrochloric acid followed by direct current plasma emission spectroscopy (DCP) analysis of the extract.

The invention is explained more in detail by the following examples, but it should be noted that the invention is not to be limited by these examples.

EXAMPLE 1a

Preparation of Felt-Bags

Five layers of 40 μm thick and 40 mm long polyethylene fibres were needle punched together forming a 160 g/m² felt. A 1.5 cm * 1.5 cm piece of this felt was encompassed in a 20 g/m² non-woven fabric by hot-sealing according to FIGS. 1 to 3.

EXAMPLE 1b

Grafting of Acrylic Acid onto Polyethylene Felt-Bags

Figure 7:
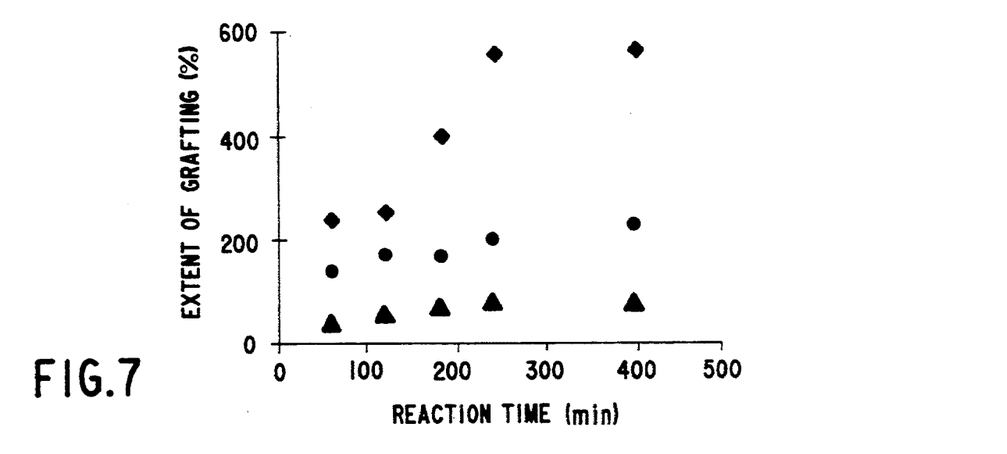
FIG. 7 shows the extent of grafting of acrylic acid onto polyethylene fibre felts as a function of reaction time at a reaction temperature of 40° C. and 70% aqueous acrylic acid for different total radiation doses ( ▲=50 kGy, ● =100 kGy, ◆ =200 kGy).

Polyethylene felt-bags (1.5 cm * 1.5 cm, 160 g/m²) were irradiated under a nitrogen atmosphere using an Electrocurtain ® electron accelerator, operating at 175 kV, to a total dose of 200 kGy. The irradiated felt-bags were immediately immersed in 70 vol-% acrylic acid aqueous solutions, which were purged with nitrogen in advance for at least 30 minutes. The temperature of the graft solution was 70° C. Different graft copolymers were obtained by varying the acrylic acid concentration and the reaction time. When the reactions were stopped the grafted felt-bags were Soxhlet extracted with water overnight to remove any monomer or homopolymer present and the extent of grafting was calculated as described earlier. The extent of grafting as a function of reaction time is presented in FIG. 7.

EXAMPLE 2

Grafting of Acrylamide onto Polyethylene Felt-Bags

Figure 8:
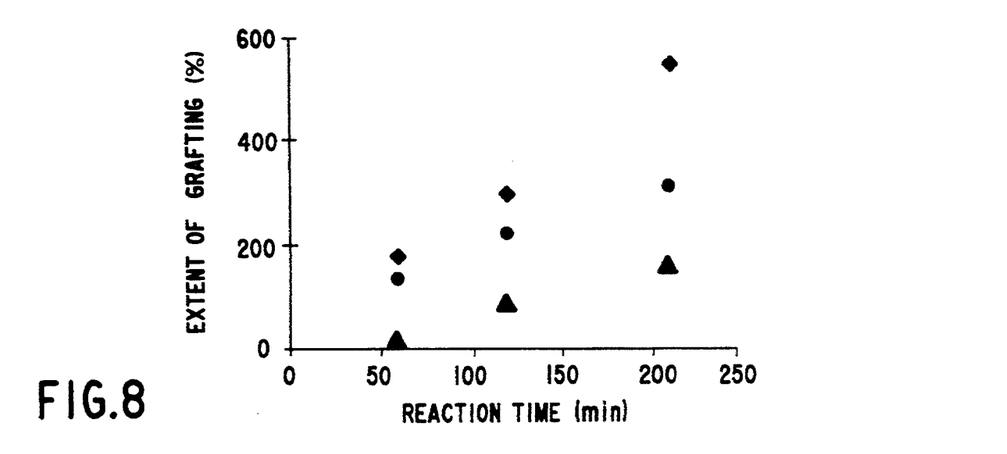
FIG. 8 shows the extent of grafting of acrylamide onto polyethylene fibre felts as a function of reaction time at a reaction temperature of 40° C. and 30% aqueous acrylamide for different total radiation doses ( ▲=50 kGy, ● =100 kGy, ◆ =500 kGy).

Polyethylene felt-bags prepared according to Example 1a (1.5 cm * 1.5 cm, 160 g/m$^2$) were irradiated under a nitrogen atmosphere using an Electrocurtain ® electron accelerator, operating at 175 kV, to a total dose of 500 kGy. The irradiated felt-bags were immediately immersed in 30 wt-% acrylamide aqueous solutions, which were purged with nitrogen in advance for at least 30 minutes. The temperature of the graft solution was 40° C. Different graft copolymers were obtained by varying the radiation dose and the reaction time. When the reactions were stopped the grafted felt bags were Soxhlet extracted overnight to remove any monomer or homopolymer present and the extent of grafting was calculated as described earlier. The extent of grafting as a function of reaction time is presented in FIG. 8.

EXAMPLE 3

Grafting of 4-Vinylpyridine onto Oolyethylene Felt-Bags

Figure 9:
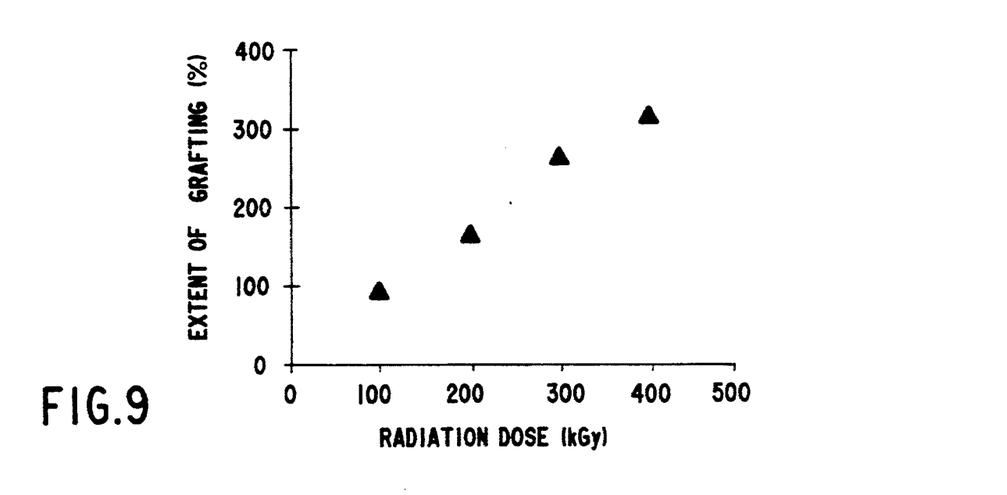
FIG. 9 shows the extent of grafting of 4-vinylpyridine onto polyethylene fibre felts as a function of radiation dose at ambient temperature. The reaction time was 6 h.

Polyethylene felt-bags prepared according to Example 1a (1.5 cm * 1.5 cm, 160 g/m$^2$) were irradiated under a nitrogen atmosphere using an Electrocurtain ® electron accelerator, operating at 175 kV. The irradiated felt-bags were immediately immersed in neat 4-vinylpyridine, which was purged with nitrogen in advance for at least 30 minutes. The grafting reactions were carried out at ambient temperature. Different graft copolymers were obtained by varying the radiation dose. When the reactions were stopped the grafted felt-bags were Soxhlet extracted with chloroform overnight to remove any monomer or homopolymer present and the extent of grafting was calculated as described earlier. The extent of grafting as a function of radiation dose is presented in FIG. 9.

EXAMPLE 4

Grafting of Vinylbenzylchloride onto Polyethylene Felt-Bags

Figure 10:
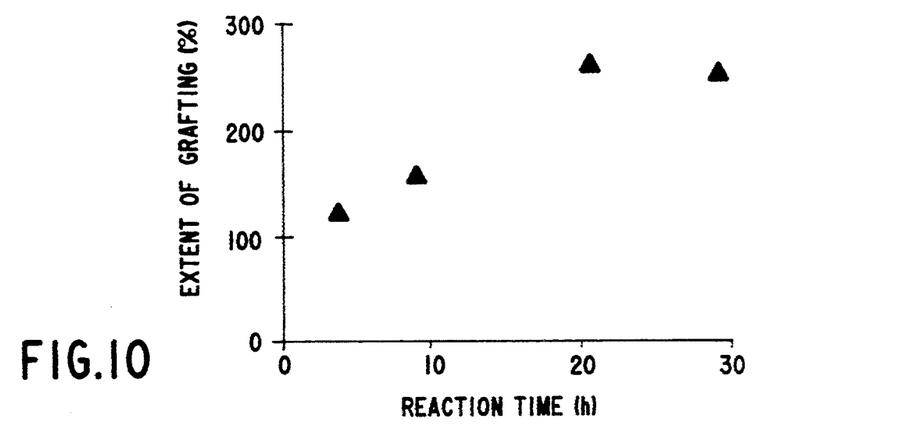
FIG. 10 shows the extent of grafting of vinylbenzylchloride onto polyethylene fibre felts as a function of reaction time at ambient temperature and with a radiation dose of 200 kGy.

Polyethylene felt-bags prepared according to Example 1a (1.5 cm * 1.5 cm, 160 g/m$^2$) were irradiated under nitrogen atmosphere using an Electrocurtain ® electron accelerator, operating at 175 kV, to a total dose of 200 kGy. The irradiated felt-bags were immediately immersed in neat vinylbenzylchloride, which was purged with nitrogen in advance for at least 30 minutes. The reactions were carried out at ambient temperature. Different graft copolymers were obtained by varying the reaction time. When the reactions were stopped the grafted felt-bags were Soxhlet extracted with chloroform to remove any monomer or homopolymer present and the extent of grafting was calculated as described earlier. The extent of grafting as a function of reaction time is presented in FIG. 10.

EXAMPLE 5

Figure 11:
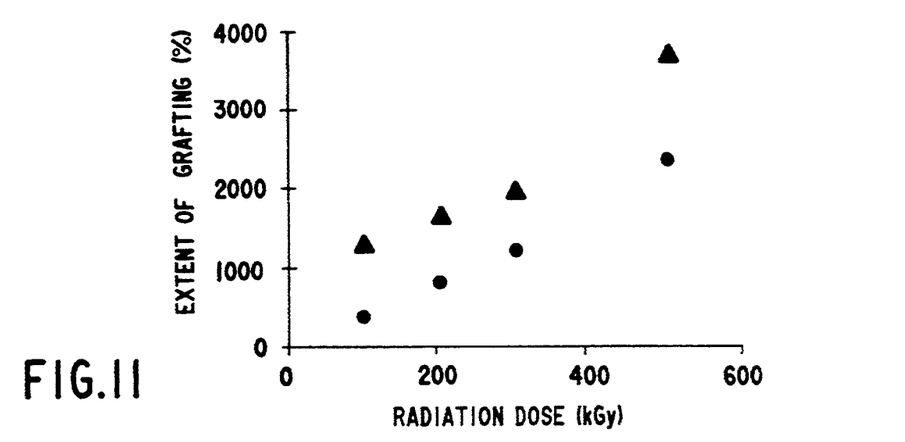
FIG. 11 shows the extent of grafting of acrylic acid onto polypropylene ▲ and polyethylene ● non-woven fabrics as a function of radiation dose for a reaction temperature of 70° C., a reaction time of 8 hours and monomer concentration of 70% aqueous acrylic acid. The reaction time was 6 h.

Grafting of Acrylic Acid onto Polypropylene or Polyethylene Non-Woven Fabrics and the Subsequent Encompassment in a Bag Polypropylene and polyethylene non-woven fabrics (4 cm * 7 cm, 20 g/m$^2$) were irradiated under a nitrogen atmosphere using an Electrocurtain ® electron accelerator, operating at 175 kV. The irradiated fabrics were immediately immersed in 70% acrylic acid aqueous solutions, which were purged with nitrogen in advance for at least 30 minutes. The temperature of the graft solution was 70° C. Different graft copolymers were obtained by varying the radiation dose. When the reactions were stopped the non-woven fabrics were Soxhlet extracted with water overnight to remove any monomer or homopolymer present and the extent of grafting was calculated as described earlier. The extent of grafting as a function of radiation dose is presented in FIG. 11. Finally the grafted fabric was encompassed in a non-grafted polyethylene non-woven fabric according to FIGS. 1 to 3.

EXAMPLE 6

Figure 12:
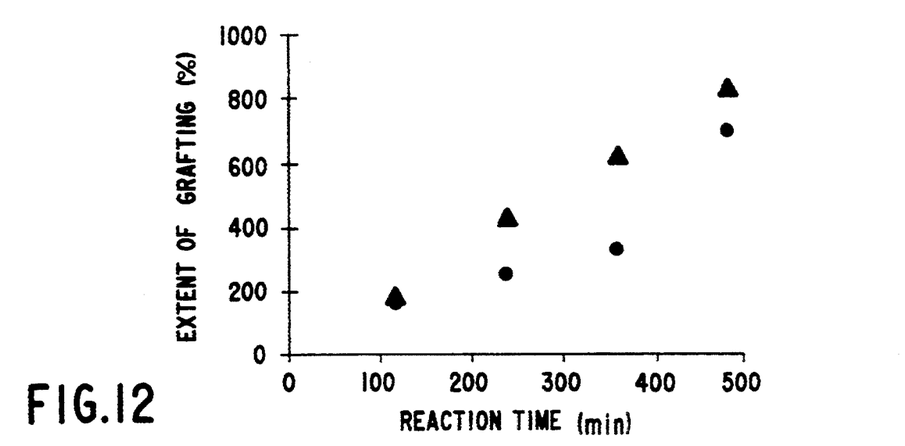
FIG. 12 shows the extent of grafting of 4-vinylpyridine onto polypropylene ▲ and polyethylene ● non-woven fabrics as a function of reaction time at ambient temperature and with a radiation dose of 500 kGy.

Grafting of 4-Vinylpyridine onto Polyethylene or Polypropylene Non-Woven Fabrics and the Subsequent Encompassment in a Bag Polyethylene and polypropylene non-woven fabrics (4 cm * 7 cm, 20 g/m$^2$) were irradiated under a nitrogen atmosphere using an Electrocurtain ® electron accelerator, operating at 175 kV, to a total dose of 500 kGy. The irradiated non-woven fabrics were immediately immersed in neat 4-vinylpyridine, which was purged with nitrogen in advance for at least 30 minutes. The reactions were carried out at ambient temperature. Different graft copolymers were obtained by varying the reaction time. When the reactions were stopped the grafted non-woven fabrics were Soxhlet extracted with chloroform overnight to remove any monomer or homopolymer present and the extent of grafting was calculated as described earlier. The extent of grafting as a function of time is presented in FIG. 12. Finally the grafted fabric was encompassed in a non-grafted polyethylene non-woven fabric according to FIGS. 1 to 3.

EXAMPLE 7

Preparation of a Polymer Supported Palladium Catalyst 1 g of a non-woven fabric prepared as in example 5 was allowed to swell in distilled water overnight. To the swollen non-woven fabric was added 0.16 g PdCl$_2$ in distilled water. The mixture was stirred for 48 hours. After this the palladium loaded fabric was separated, rinsed with water, Soxhlet extracted with water for 24 h and finally dried. The amount of palladium in the fabric was determined by repeated extraction with 1M hydrochloric acid followed by DCP analysis of the extract. The amount of palladium was found to be 0.91 mmol Pd/g fabric.

EXAMPLE 8

Preparation of a Polymer Supported Ruthenium Catalyst 1 g of a non-woven fabric prepared as in example 6 was allowed to swell in distilled water overnight. To the swollen fabric was added 0.48 g RuCl₃ in distilled water. The mixture was stirred for 48 h. After this the ruthenium loaded fabric was separated, rinsed with water, soxhlet extracted with water for 24 h and finally dried.

EXAMPLE 9

Preparation of a Polymer Supported Palladium Catalyst 0.68 g of a non-woven fabric prepared as in example 6 was allowed to swell in distilled water overnight. To the swollen fabric was added 0.24 g PdCl₂ in distilled water. The mixture was stirred for 48 h. After this the palladium loaded fabric was separated, rinsed with water, Soxhlet extracted with water and finally dried. The palladium loading was calculated to be 2 mmol Pd/g fabric.

EXAMPLE 10

Preparation of a Polymer Supported Chromium Reagent

A non-woven fabric prepared as in example 6 was added to a solution of chromium trioxide in water and left stirring at ambient temperature for 18 h. After this the fabric was washed repeatedly with water until the filtrate was colorless. The fabric was thereafter ready for use or dried for storage.

EXAMPLE 11

Oxidation of Benzyl Alcohol with a Polymer Supported Chromium Reagent

A polymer supported chromium reagent, 0.61 g, prepared as in example 10 was swelled in water prior to use. The fabric was then blotted dry and transferred to a vessel containing 4 ml cyclohexane. 0.55 mmol of benzyl alcohol was added and stirring was continued at 70° C. After 1 h of stirring 99% of the benzyl alcohol had been converted to benzaldehyde.

EXAMPLE 12

Oxidation of 2-Butene-1,4-Diol With a Polymer Supported Chromium Reagent

A polymer supported chromium reagent, 1.82 g, prepared as in example 10, was transferred to a vessel containing 20 ml distilled water. 2-Butene-1,4-diol was added to the vessel and left stirring for 56 hours at ambient temperature. 2-Butene-1,4-diol was converted to 2-furanone and no other by-products were detected by gas chromatography.

EXAMPLE 13

Hydrogenation of 1-Octene Catalyzed by Palladium Loaded Poly[Propylene-Graft-Acrylic Acid] Non-Woven Fabric Before use the palladium loaded polymer, prepared according to example 9, was treated with hydrogen in order to reduce palladium (II) to palladium (0), by suspending it in methanol and passing hydrogen gas through for two hours.

The hydrogenation of 1-octene was carried out in a 100 ml round-bottomed flask. The vessel was thermostatted to 30° C., provided with a magnetic stirrer and connected to a gas burette that maintained the reaction at constant 1 atm. hydrogen pressure. In the reaction vessel 0.12 g of the dried palladium catalyst and 45 ml of methanol were placed. Stirring was started and the air in the system was displaced by repeating the process of evacuating and flushing with hydrogen three times. Finally, an adequate amount of hydrogen gas was stored in the gas burette, and the mixture was stirred 30 minutes to saturate the solution with hydrogen. The stirring was stopped and 5 ml of a 0.995M 1-octene solution in methanol was injected into the reaction vessel. The reaction was initiated by starting the stirrer. The stirring speed was 1000 rpm. The progress of the hydrogenation was followed by recording the hydrogen uptake vs. time. The initial rates of the hydrogenation was calculated from the slope of the amount of hydrogen absorbed versus the reaction time. The catalyst was easily recovered by manually removing the fabric from the reacting mixture and was reused after washing with methanol. The catalyst was reused several times with similar reaction kinetics. The half life of the hydrogenation reaction was found to be 10 minutes. The reaction rate was found to be 9.2 ml H₂ per second and gram of Pd.

EXAMPLE 14

Hydrogenation of 1-Octene Catalyzed by a Palladium Loaded Poly[Propylene-Graft-4-Vinylpyridine] Non-Woven Fabric 0.12 g of the polymer bound catalyst, prepared according to examples 6 and 9, was used for the hydrogenation of 1-octene. The hydrogenations were carried out in accordance with example 13. The catalyst was easily recovered by picking up the fabric from the reaction solution and was reused after washing with methanol. The catalyst was reused several times with similar reaction kinetics. The half life of the hydrogenation reaction was found to be 9.9 minutes.

EXAMPLE 15

Derivatizing a Poly[Ethylene-Graft-Vinylbenzylchloride] Felt-Bag with Bis(Phosphonic Acid)

In a flame dried two-necked flask, equipped with a dropping funnel and protected with nitrogen gas, 100 ml of dry toluene and a poly[ethylene-graft-vinylbenzylchloride] felt-bag was placed. The polyethylene felt-bag was prepared according to example 4 (m=0.3368 g, 0.00148 mol Cl). The sodium salt of tetraethyl ethane-1,1-bisphosphonate was prepared in the dropping funnel by reacting sodium hydride (NaH) with tetraethyl ethane-1,1-bisphosphonate. 0.0022 mol of the prepared salt was introduced to the reaction mixture and stirring was started. The reaction was continued under protective gas for two weeks at ambient temperature. The felt-bag was washed several times with a 9/1 THF/water solution to remove excess NaCl and dried in vacuum to yield 0.4505 g polyethylene felt-bag supported bisphosphonate. The bisphosphonate ester was converted to the free acid form by hydrolysis in concentrated hydrochloric acid.

We claim:

1. A polymer support with highly accessible reactive groups onto which a functional group or a metal can be attached, said polymer support comprising a polyolefin or a fluorine containing polyolefin which is grafted with reactive groups suitable to bind the functional group or metal to be attached and a bag in which the polyolefin or fluorine containing polyolefin is enclosed and which is made of meshed fabric which is tight enough to essentially prevent the polyolefin or fluorine containing polyolefin from coming out of the bag.

2. The polymer support according to claim 1 wherein the polyolefin or fluorine containing polyolefin is a fibrous material.

3. The polymer support according to claim 2 wherein the fibrous polyolefin or fluorine containing polyolefin is formed into a felt or non-woven fabric.

4. The polymer support according to claim 1 wherein the polyolefin is an α-polyolefin.

5. The polymer support according to claim 1 wherein the polyolefin or fluorine containing polyolefin is a homo- or copolymer of ethylene or propylene or of a fluorine containing polyolefin.

6. The polymer support according to claim 1 wherein the reactive group is a double bond containing substance.

7. The polymer support according to claim 6 wherein the reactive group is a compound selected from a group of monomers consisting of a carboxylic acid, acrylate, acrylamide, vinylpyridine, phosphonic acid and a styrene derivative.

8. The polymer support according to claim 1 wherein the meshed fabric is a non-woven fabric based on an organic polymer.

9. A functionalized polymer support wherein a functional group is attached to the reactive group of the polymer support according to any one of claims 1 to 8.

10. A functionalized polymer support wherein a metal is attached to the reactive group of the polymer support according to any one of claims 1 to 8.

11. A functionalized polymer support wherein a metal selected from the group consisting of palladium and ruthenium is attached to the reactive group of the polymer support according to any one of claims 1 to 8.

12. A functionalized polymer support wherein a reagent or catalyst for use in chemical syntheses is attached to the reactive group of the polymer support according to any one of claims 1 to 8.

* * * * *